(12) United States Patent
Jones et al.

(10) Patent No.: US 11,076,069 B2
(45) Date of Patent: Jul. 27, 2021

(54) PIXELATION DENSITY INCREMENT FOR EMBEDDING INFORMATION

(71) Applicant: Idemia Identity & Security USA LLC, Billerica, MA (US)

(72) Inventors: Robert L. Jones, Andover, MA (US); Yecheng Wu, Lexington, MA (US); Daoshen Bi, Boxborough, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 58 days.

(21) Appl. No.: 16/236,880

(22) Filed: Dec. 31, 2018

(65) Prior Publication Data
US 2019/0208077 A1 Jul. 4, 2019

Related U.S. Application Data

(60) Provisional application No. 62/611,871, filed on Dec. 29, 2017.

(51) Int. Cl.
| | |
|---|---|
| *G06K 9/00* | (2006.01) |
| *H04N 1/32* | (2006.01) |
| *G06K 9/46* | (2006.01) |

(52) U.S. Cl.
CPC ..... *H04N 1/32304* (2013.01); *G06K 9/00442* (2013.01); *G06K 9/4604* (2013.01); *H04N 1/32229* (2013.01)

(58) Field of Classification Search
CPC ........... H04N 1/32304; H04N 1/32229; G06K 9/4604; G06K 9/00442; G06K 2009/0059
See application file for complete search history.

(56) References Cited

U.S. PATENT DOCUMENTS

| | | | | |
|---|---|---|---|---|
| 7,751,585 | B2 * | 7/2010 | Jancke | G06K 19/06037 |
| | | | | 382/100 |
| 7,936,901 | B2 * | 5/2011 | Jancke | G06K 19/06037 |
| | | | | 382/100 |
| 2004/0181671 | A1 * | 9/2004 | Brundage | H04L 9/3231 |
| | | | | 713/176 |
| 2010/0147961 | A1 | 6/2010 | Jancke | |
| 2010/0164220 | A1 * | 7/2010 | Kaskiala | B42D 25/405 |
| | | | | 283/108 |
| 2011/0057040 | A1 * | 3/2011 | Jones | B42D 25/41 |
| | | | | 235/487 |

(Continued)

OTHER PUBLICATIONS

International Search Report and Written Opinion in International Application No. PCT/US2018/068140, dated Apr. 15, 2019.

*Primary Examiner* — Samir A Ahmed
(74) *Attorney, Agent, or Firm* — Fish & Richardson P.C.

(57) ABSTRACT

Methods, systems, and apparatus, including computer programs encoded on a computer storage medium, for determining, by a pixelation device, an arrangement of pixels for generating representations of data for a document; adjusting, by an increment module and based on the arrangement of pixels, an optical density of one or more pixels included in the arrangement; associating, by the pixelation device, a plurality of distinct types of credential data with one or more line patterns included in the arrangement of pixels; and generating, by the pixelation device, multiple line patterns at a document, the multiple line patterns encoding the plurality of distinct types of credential data.

20 Claims, 5 Drawing Sheets

(56) References Cited

U.S. PATENT DOCUMENTS

| | | | |
|---|---|---|---|
| 2013/0154250 A1* | 6/2013 | Dunn | B42D 25/342 |
| | | | 283/67 |
| 2014/0035720 A1* | 2/2014 | Chapman | B42D 25/309 |
| | | | 340/5.51 |
| 2015/0302421 A1 | 10/2015 | Caton et al. | |
| 2017/0144470 A1* | 5/2017 | Freudenberger | G06K 15/1209 |

* cited by examiner

PIXELATION DENSITY INCREMENT FOR EMBEDDING INFORMATION

CROSS-REFERENCE TO RELATED APPLICATION

This application claims benefit of the filing date of U.S. Provisional Application No. 62/611,871, filed on Dec. 29, 2017. The contents of U.S. Provisional Application No. 62/611,871 is expressly incorporated by reference herein in its entirety.

This application is related to U.S. Provisional Patent Application No. 62/611,504, entitled "LINE SEGMENT CODE FOR EMBEDDING INFORMATION IN AN IMAGE," filed on Dec. 28, 2017. The entire disclosure of U.S. Patent Application No. 62/611,504, is expressly incorporated by reference herein in its entirety.

This application is related to U.S. patent application Ser. No. 15/808,628, entitled "EMBEDDING SECURITY INFORMATION IN AN IMAGE," filed on Nov. 9, 2017. The entire disclosure of U.S. patent application Ser. No. 15/808,628 is expressly incorporated by reference herein in its entirety.

FIELD

This specification relates to line segment code for embedding information in an image.

BACKGROUND

User identifications such as driver licenses can be issued either as physical identification cards or digital identifications. A physical identification card is issued by creating a card that includes customer or cardholder information, whereas a digital identification is issued in an electronic format and accessed using a client device. Both physical and digital identifications are commonly used for verifying the identity of an individual, providing access to restricted areas, or authorizing an individual to purchase age-restricted content.

SUMMARY

This specification describes techniques for using pixelation density increment technology to embed encoded information at a physical or digital card (e.g., an identification card). Individual pixels are selected to carry data by assigning certain density levels that are ascribed to numerical or letter values. An increment of optical density ("OD") is selected so that a computing device (e.g., a machine for reading/scanning data) can differentiate between various pixels based on their adjusted or incremented optical density. Additionally, the pixels can be placed in an array and configured or arranged in a pattern to facilitate ease of recognizing and then subsequently reading pixel density information to obtain the embedded information. In one example, pixels with assigned optical density values can be spaced apart by a predefined number of pixels (e.g., two to three pixels).

One aspect of the subject matter described in this specification can be embodied in a computer-implemented method. The method includes determining, by a pixelation device, an arrangement of pixels to obtain data from a document; associating, by the pixelation device, credential data about an individual with multiple line code segments, the line code segments being used to encode distinct types of credential data about the individual at the document based on the arrangement of pixels; and generating, using an increment module of the pixelation device, a line pattern at the document by adjusting an optical density of each pixel in the arrangement of pixels, the line pattern comprising the multiple line code segments to encode the distinct types of credential data at the document.

These and other implementations can each optionally include one or more of the following features. For example, in some implementations, generating the line pattern includes selecting one or more pixels of the arrangement of pixels; and assigning a particular optical density level to each of the selected one or more pixels of the arrangement of pixels. In some implementations, generating the line pattern includes generating the line pattern by ascribing a numerical or text value to the one or more pixels of the arrangement of pixels using the particular optical density level assigned to each of the selected one or more pixels.

In some implementations, the method further includes generating a plurality of line patterns at the document by adjusting the optical density of each pixel in the arrangement of pixels; and generating, using an increment module of the pixelation device, an array of pixels that includes the plurality of line patterns, the array of pixels being generated based on a coded scheme to represent particular types of line patterns on the document.

In some implementations, the array of pixels is disposed at a specific location of the document to enable obtaining a specific encoded credential data about the individual. In some implementations, each pixel in the arrangement of pixels is used to depict representations of data that correspond to the credential data; and the line pattern is detectable based on differences in optical density of two or more pixels in the arrangement of pixels to obtain the representations of data.

In some implementations, the method further includes detecting, by a scanning device, the line code segments of the line pattern at the document based on the adjusted optical density of each pixel in the arrangement of pixels. In some implementations, the method further includes obtaining, by the scanning device, at least one of the distinct types of credential data at the document in response to decoding line code segments that are associated with at least a portion of the credential data about the individual.

In some implementations, generating the line pattern includes using pixelation density increments to embed identifying information about the individual in the line pattern disposed at the document. In some implementations, the document is an identification document and the embedded identifying information describes a physical attribute of the individual.

Other implementations of this and other aspects include corresponding systems, apparatus, and computer programs, configured to perform the actions of the methods, encoded on computer storage devices, e.g., non-transitory machine-readable storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented to realize one or more of the following advantages. The described techniques relate to data embedding technology for writing individual pixels at prescribed density gradients and shapes (e.g., lines, curves, wave patterns, other designs). In addition, the described data embedding technology can be implemented to scan, read, or otherwise interpret density gradient patterns and shapes included in a digital or physical identification document. For example, user credentials encoded via line patterns with pixelation density increments can be scanned, analyzed, and decoded using an example camera system of a smart phone or related data scanning device. The described techniques can be used to efficiently embed and encode or otherwise encrypt larger amounts of credential data, thereby providing improved security of a cardholder's personal information relative to conventional methods.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
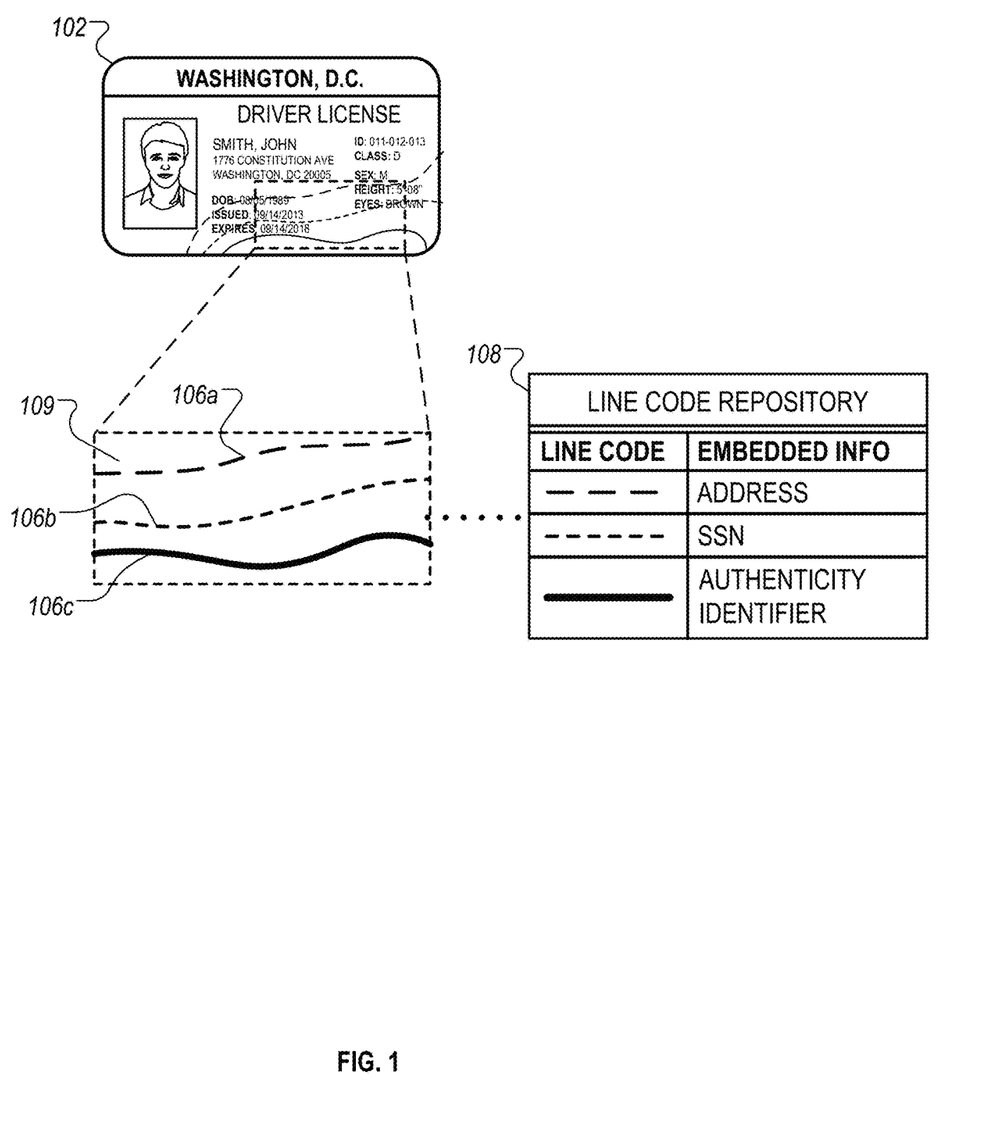
FIG. 1 illustrates an example of an identification document with embedded line segment data.

FIG. 1 illustrates an example of a physical identification document (e.g., an ID card) with line patterns embedded at a certain region/area of the document. In the example, identification/ID card 102 includes a customer photograph and embedded line patterns 106a, 106b, and 106c. Identification 102 is constructed such that different regions or areas of the identification article are outlined with different patterns. For example, line pattern 106a outlines a line pattern having a first spacing characteristic, line pattern 106b outlines a line pattern having a second spacing characteristic that differs from the first (i.e., smaller length), and line pattern 106c includes a solid line portion that can be used to indicate an authenticity identifier.

In some implementations, lines associated with a particular pre-print pattern can have certain line portions removed. The removed line portions therefore create an area/space 109 in which line segments associated with line code can be embedded. In some implementations, the line code can be configured in a curved manner to create outlines of particular patterns, such as buildings, state capitals, state birds, or any other background patterns or image outlines corresponding to a particular authority indicator/identifier for a given jurisdiction. In some implementations, the line patterns are used as part of the image data associated with an ID card. The line patterns can be used to securely embed encoded data that relate to identifying features of an individual.

Although the figure illustrates line patterns 106a-c being embedded within a physical identification, in other instances, the line patterns 106a-c can also be embedded within a digital identification (e.g., a digitally issued driver license). In addition, although the example depicted illustrates visibly detectable line patterns (e.g., visible to a human eye), in other instances, the line patterns can be constructed small enough to appear invisible to the human eye. In such instances, the line patterns can outline microfeatures of a customer photograph (or other portions of the identification 102).

Each of the line patterns 106a, 106b, and 106c are distinctive from one another based on their line attributes. Examples of line attributes include the spacing of line segments within a pattern line, the length of the pattern line, the color of the pattern line, among others. As described above, the line pattern is also associated with a portion of secure customer information. The secure customer information can be identified within a line pattern repository 108 that includes mappings between each line pattern and corresponding secure customer information. As depicted, the line pattern 106a is mapped to customer address, the line pattern 106b is mapped to a social security number, and the line pattern 106c is mapped to an authenticity identifier.

The detection of the line patterns 106a-c and associated secure customer information can be used to verify the authenticity of the identification 102. As an example, verification data for the identification 102 can specify the line patterns 106a-c, the arrangement of the line patterns 106a-c within identification 102, and/or the associated credential information included within the line pattern repository 108. In this example, a detector device (described below) may compare detection data obtained from an identification presented by a customer to the verification data for the identification 102. For instance, if the detector device fails to detect each of the line patterns 106a-c, or detects an incorrect arrangement of the line patterns 106a-c, then the detector device may determine that the presented identification is a fraudulent ID card.

In another example, secure customer information obtained from the detected line patterns of a presented identification can be used to authenticate a customer in addition to the credential information specified by the identification (e.g., name, date of birth, address, etc.). In this example, line patterns can be included and/or embedded within the identification to securely authenticate a customer without exposing sensitive or personally identifiable information (e.g., social security number). In this regard, line pattern detection can be used to securely verify sensitive customer information.

Figure 2:
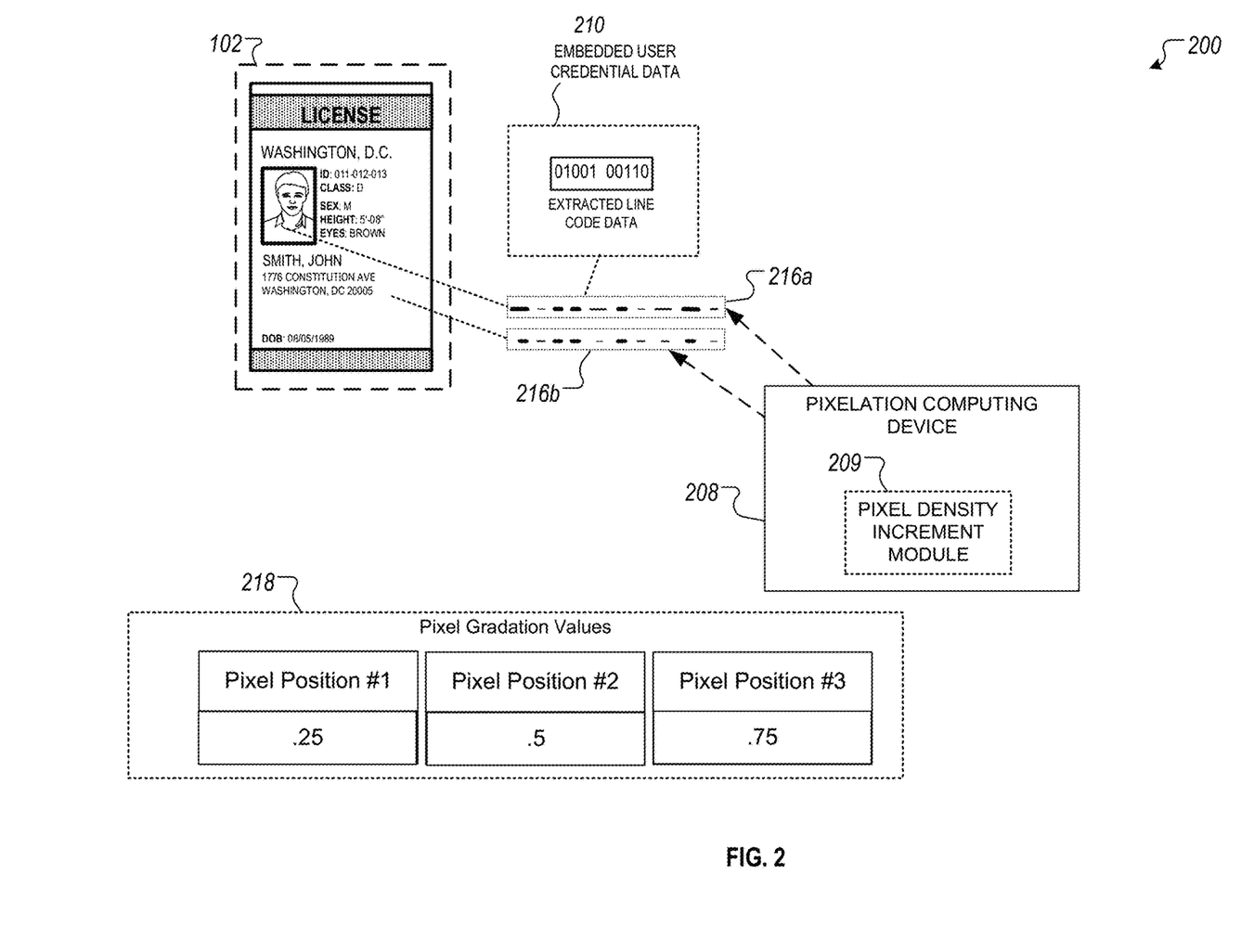
FIG. 2 illustrates an example system for embedding information using pixelation density increments.

FIG. 2 illustrates an example system 200 for embedding information in an identification (ID) document 102 using pixelation density increments. ID document 102 can be digital or physical identification card that includes embedded line segments that are used to encode credential data for an individual. The credential data can be personally identifiable information about an individual, such as a person's social security number, address, date of birth, or driver's license number. As described in more detail below, the line patterns and line segments of the patterns can be created using a pixelation process that is based on pixelation density increment technology. Line patterns that are created using this pixelation process are embedded in an ID document or card (e.g., at a particular layer of the card) and are used to encode personal information based on line pattern technology.

System 200 generally includes a computing device 208 that executes programmed instructions for performing incremental changes or adjustments to pixels. The pixels are used to generate visible information and depict representations of data that are included in an identification document. Device 208 can be a pixelation computing device that includes a pixel density increment module 209. While in typical implementations, pixel density increment module 209 is encoded on computer-readable media, in some implementations, pixel density increment module 209 is included within device 208 as a sub-system of hardware circuits that includes one or more processing devices or processor microchips.

In general, device 208 can include processors, memory, and data storage devices that collectively form modules and computer systems of device 208. Processors of the computer systems process instructions for execution by device 208, including instructions stored in the memory or on the data storage device to display graphical information for output at an example display monitor of system 200. Execution of the stored instructions can cause one or more of the actions described herein to be performed by device 208 or pixel density increment module 209. In other implementations, multiple processors may be used, as appropriate, along with multiple memories and types of memory. For example, device 208 may be connected with multiple other computing devices, with each device (e.g., a server bank, groups of servers, modules, or a multi-processor system) performing portions of the actions, operations, or logical flows described in this specification. In some implementations, device 208 is one of multiple devices that each interact to manufacture physical identification cards or to generate/create digital identification cards.

As used in this specification, and with reference to pixel density increment module 209, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

Referring again to FIG. 2, device 208 can be used to create various types of line patterns that can be included at an ID document 102. The various types of line patterns can be based on differences in optical density of pixels that depict data included in ID document 102. As described in more detail below, if the optical density based line pattern is known (e.g., detectable) to a scanning device (e.g., a digital camera application), then the scanning device can read and interpret/decode the encoded data in the document.

Optical density can be a measure of the extent to which a substance transmits, or reflects, light or other electromagnetic radiation. Optical density can also represent a measure of absorbance, and is defined as the ratio of the intensity of light falling upon a material and the intensity transmitted. A pixel is the smallest unit of an image (e.g., a digital image) or graphic that can be displayed and represented on a physical card or digital display device. In general, optical density can refer to a measure of relative brightness of a pixel associated with a physical card or a digital card. As used herein, pixelation density increment for embedding information corresponds to incremental adjustments to a relative brightness of a pixel or an arrangement of pixels to embed or encode information at the physical or digital card.

As described above, individual pixels are selected to carry data by assigning certain optical density levels that are ascribed to numerical or letter values. An increment of optical density ("OD") is selected so that a computing device (e.g., a machine for reading/scanning data) can differentiate between various pixels that form line patterns based on their adjusted or incremented optical density. Additionally, the pixels that form one or more line patterns can be placed in an array and arranged in a pattern to facilitate ease of "recognizing" and then subsequently "reading" encoded data represented by the pixels. For example, device 208 can use coded schemes to generate arrays of pixels that represent various line patterns. The arrays can be disposed at specific locations of ID document 102 to facilitate (or enable) identifying and interpreting encoded data ID document 102. In some implementations, module 209 causes pixels with assigned optical density values to be spaced apart by a predefined number of pixels (e.g., two to three pixels). The predefined number for the spacing apart of pixels can be determined with reference to density spread. For example, the spacing apart of pixels can be based on whether a density spread can be determined dependent upon perso technology and receiving media.

Using device 208, line patterns such as circles or stars can be created or written at ID document 102. The patterns can be configured to blend in with background content of ID document 102 while still being distinguishable at ID document 102 and without distorting or obscuring other credential data included in the document. In some implementations, a line pattern that encodes data can resemble a routine or basic line generally included in ID document 102 when a spacing of two pixels is used along with a minimum lowest density of each pixel (depending upon the perso method used).

The visual appearance of a line pattern generated in accordance with the described techniques can be a geometric pattern or one of a variety of other types of patterns. The line pattern can have any visual appearance or geometric pattern that is supported by adjusting an optical density of pixels. In some implementations, for X,Y arrays of perso' technology, device 208 is configured to determine or select a particular pattern of pixelation. For example, pixels that form the patterns can be arranged as curved lines, circles, or arcs. Device 208 can include, or be configured to develop, standard methods for identifying particular patterns. In some cases, device 208 is operable to identify registration pointers to facilitate expedited retrieval of line pattern data as well as encoded cardholder credentials.

To embed sensitive cardholder information or credential data, the device 208 uses pixelation density increments to create various line patterns for embedding encoded information on a document. The document can be a physical identification card or a digital identification card. For example, using the described techniques, device 208 can create line patterns 216a and 216b, where the patterns are formed based on differences in optical density of each pixel in the respective line patterns 216a, 216b. Line pattern 216a corresponds to a pattern with line segments that have different lengths and different optical density, while line pattern 216b corresponds to a pattern with line segments that each have the same lengths but different optical density.

In some implementations, line patterns 216 that are embedded or integrated on an example physical or digital identification document (e.g., a card or displayed image on a device) can be formed using a series of lines that create the appearance of a wave going across the face of the identification document.

Line patterns can be used to encode a particular quantity of data. In some implementations, a single line of 300 dpi printed pixels can have 150 pixels for encoding data. The 150 pixels can correspond to 150 data points that are located with a predefined space on an example document. For example, in a space that is 1/300th of an inch (0.0033" or 3 mils thick) module 209 can ascribe or encode certain data values to each of the 150 points inside of one inch by 0.0033". In some implementations, module 209 can define a space across an example card or document to encode information on the card. For example, the space can be approximately three inches of a length dimension of the card and module 209 can use an arrangement of 450 pixels (e.g., 3×150) to encode credential data on the card. As an example, if a line is drawn that is 1/8" thick and pixels along the line are spaced 1 pixel apart (e.g., on the X axis), then 18 line patterns that each have 450 pixels can encode 8100 data points (e.g., 18×450). As described herein, the data is encoded by varying the optical density of pixels in the arrangement of pixels.

Line segment code technology can leverage unused white space on a card. For example, the device 209 can be used to insert or encode additional data at unused white space between line segments, thus adding more data/info into an already existing line segments. In this case, the frequency of pixel generation can be much less frequent such that one can easily discern when a line pattern begins and ends. In some implementations, the described technology of incrementing pixilation density can be used to generate geometric shapes, such as rectangles, squares, circles, and ellipses. The described techniques can be also used to generate items such as buildings, capitols, or any item that can be drafted or expressed as lines in some shape or contour. For a physical ID document 102, YAG laser engraving can be particularly suited to generating line patterns that include separate pixels with gradations or increments in their optical density. In some implementations, color pixilation can be used in addition to incrementing optical density.

The described techniques can be used to add pixelation points of varying optical density between existing line segments. In some implementations, an ID document can include existing sets of line patterns (first line patterns) with line segments that are spaced apart. The first line patterns can be generated using line code technology that differs from the pixelation density increment technology described herein. Techniques described in this document include using the spacing between the line segments of the first line patterns to embed additional data based on the added pixelation points. In some implementations, device 208 can select a range of density increments (e.g., between 0.4 and 2.0 optical density, with increments from 0.4, 0.8, 1.2, 1.6, and 2.). In some instances, device 208 can use five levels of density so that each level is assigned a value and each value is easily discriminated from all of the other optical densities.

Spacing for the added pixelation points may be confined to spaces (e.g., white spaces) between the line segments of the first line patterns and allocated accordingly. In some cases, a distance between each pixelation point is set or determined by system 100 based on the particular card application. In some implementations, another set of line patterns (e.g., second line patterns) generated using the added pixelation points can be applied at a particular layer of an ID document 102 using the same technology as the first line patterns, or by a different technology—dependent upon the registration control needed to align the pixels with the line segments.

As shown at FIG. 2, ID document 102 can include example line patterns 216a/b embedded in identification 102 (e.g., embedded using a Lasink process). As shown in FIG. 2, line patterns 216a/b correspond to encoded data that is scanned and used to generate an example binary data sequence that includes "01001 00110." In some cases, the binary data sequence can include more of fewer bits (e.g., 2 bits to 1,000 bits). As described in more detail below, encoded line data can be decoded, in part, by scanning or capturing an image of document 102. For example, scanning or capturing the image can be performed using a computing device such as a smartphone, a digital camera, or a laptop computing device. The example binary data sequence can be processed using a detector device (e.g., detector device 140 described below) to obtain the credential data, to authenticate the identification, or to verify the identity of the card holder. Thus, line patterns embedded within an identification document can be scanned to extract and process encoded data to provide enhanced identification verification.

Figure 3:
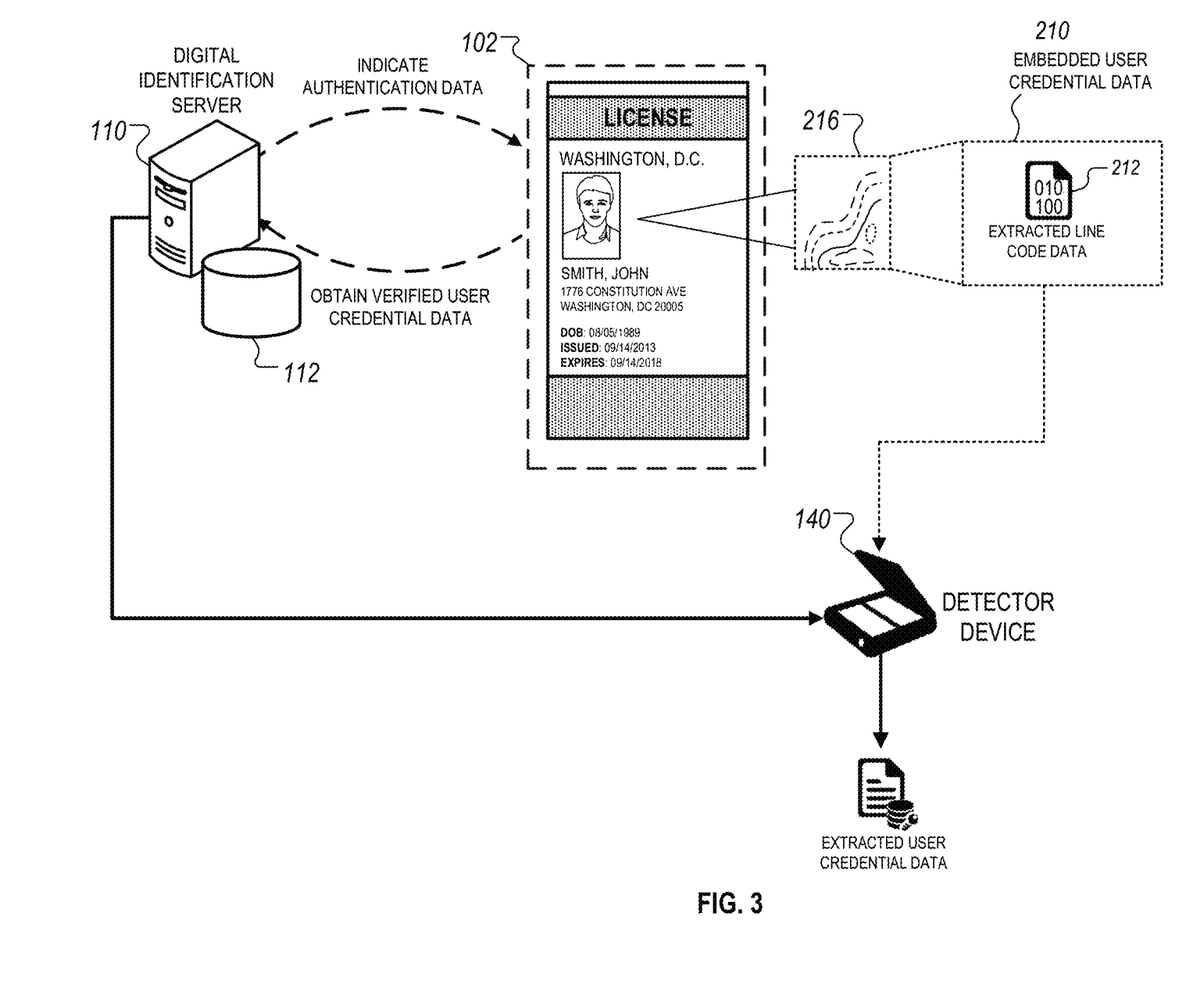
FIG. 3 illustrates an example of a system for verifying an identification document based on data extracted from embedded line patterns of the identification document.

FIG. 3 illustrates an example of a system 300 for verifying an identification document based on data extracted from embedded line patterns of the ID document 102. Identification server 110 initially obtains secure customer information using different techniques. In some instances, the secure customer information may be obtained during the enrollment process when the customer is requested to verify his identity by providing personally identifiable information (e.g., social security number, user authentication information, etc.). The obtained customer information can then be stored and associated with designated line patterns.

Line pattern repository 108 maps specific line patterns that are embedded within the ID document 102 to pieces of secure information obtained by the identification server 110. The line pattern repository 108 thus enables the identification of a corresponding piece of secure customer information based upon the detection of an embedded line pattern within the ID document 102. The line pattern repository 108 may be stored in the digital identification database 112, and subsequently transmitted to authorized devices that perform verification of the ID document 102 such as a detector device 140.

During a verification operation of ID document 102, the detector device 140 initially scans or interprets line pattern data 212 within the ID document 102. This can be accomplished using various types of optical recognition techniques. For instance, the detector device 140 can be configured to recognize designated line patterns that are included within the line pattern repository 108. During a scan of the ID document 102, the detector device 140 may identify the presence of the designated line patterns, and extract the identified line patterns as the extracted line pattern data 212. The line pattern data 212 may specify a coordinate location (e.g., in an X,Y plane) within the digital identification where a particular line pattern was detected.

The detector device 140 can then obtain secure credential data assigned to the extracted or interpreted line pattern data 210 using the information specified within the line pattern repository 108. For instance, the detector device 140 may cross-reference each of the detected line patterns indicated by the extracted line pattern data 210 with the line patterns that are specified within the line pattern repository 108 in order to determine the pieces of personal or credential information assigned to each line pattern. The detector device 140 can verify the claimed identity based on the extracted credential information 212 to verify the authenticity of the ID document 102 as well as the identity of the cardholder. In some implementations, there may be a need to create a registration mark or pattern sensing device in the credential that supplements the capture and read process— for example—if a curve (1/y) is being used then the x=1/y curve might prove useful as a register mark.

Figure 4:
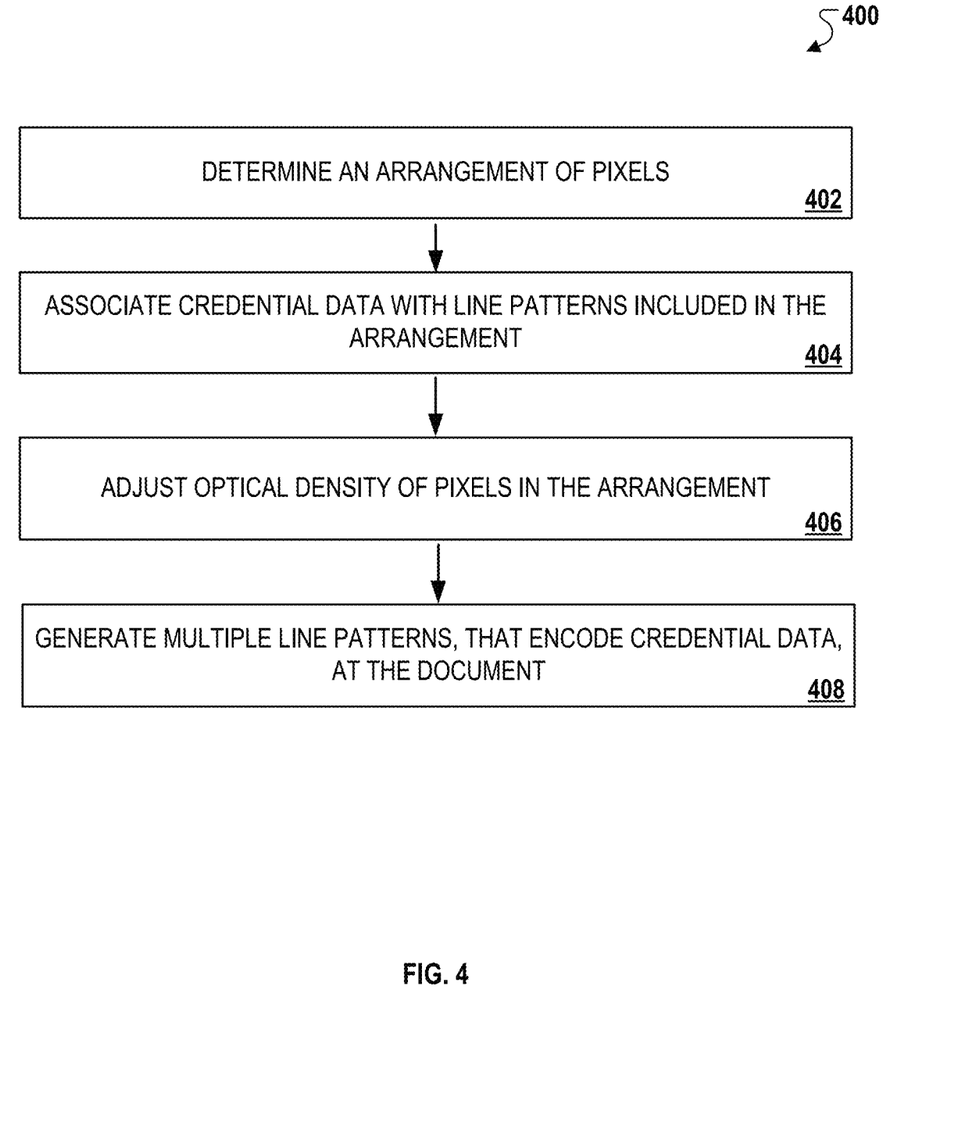
FIG. 4 shows a flow diagram of an example process for embedding information using pixelation density increments.

FIG. 4 shows a flow diagram of an example process 400 for embedding line segment data in an identification document. Process 400 can be implemented or executed using the systems and devices described above. In some implementations, the described actions of process 400 are enabled by computing logic or programmed instructions executable by processing devices and memory of computing resources described in this document.

System 200 determines an arrangement of pixels to obtain data from a document (402). For example, the pixelation device 208 can identify an arrangement of pixels on an identification document to embed or encode data and to subsequently obtain the encoded data from the document. The obtained data can correspond to credential data or other identifying information about an individual.

System 200 associates credential data about the individual with line patterns included in the arrangement of pixels (404). For example, system 200 uses the pixelation device 208 to associate credential data about an individual with multiple line code segments that form the line patterns. The line code segments are used to encode distinct types of credential data about the individual at the document based on the arrangement of pixels. In some implementations, the credential data can include identifying or biometric information about a person, such as the person's address, social security number, eye color, or a representation of the person's fingerprint.

To encode or embed credential data on the document, system 200 adjusts an optical density of pixels in the arrangement of pixels (406). For example, the pixelation device 208 uses the pixel density increment module 209 to adjust the optical density of pixels in the arrangement of pixels. The optical density is adjusted to generate one or multiple line patterns that each include line code segments. The respective line code segments can be defined by sets of pixels. In some implementations, an optical density of pixels that define unused white space between line code segments can be adjusted to form additional line patterns that or line segments for encoding credential data or other information on the document. The pixels of these white spaces can be included in the arrangement of pixels.

System 200 generates line patterns at the document by adjusting an optical density of two or more pixels in the arrangement of pixels. For example, the increment module 209 of the pixelation device 208, is used to generate multiple respective line patterns at the document by adjusting an optical density of various pixels in the arrangement of pixels. The line patterns comprise multiple line code segments that are used to encode the distinct types of credential data at the document.

Generating the line patterns can include selecting one or more pixels of the arrangement of pixels and assigning a particular optical density level to each of the selected one or more pixels of the arrangement of pixels. In some implementations, the line patterns are generated by ascribing or encoding certain numerical or text values to the one or more pixels of the arrangement of pixels. For example, the numerical or text values are assigned using the particular optical density level assigned to each of the selected one or more pixels. In some examples, a first pixel position can have an optical density of 0.25 for encoding an eye color of a person, a second pixel position can have an optical density of 0.5 for encoding a height of the person, and third pixel position can have an optical density of 0.75 for encoding another credential data or identifying information about the person. In some implementations, the incremental change or increase in optical density (e.g., 0.25 to 0.75) is also used to encode the credential data about the person.

Figure 5:
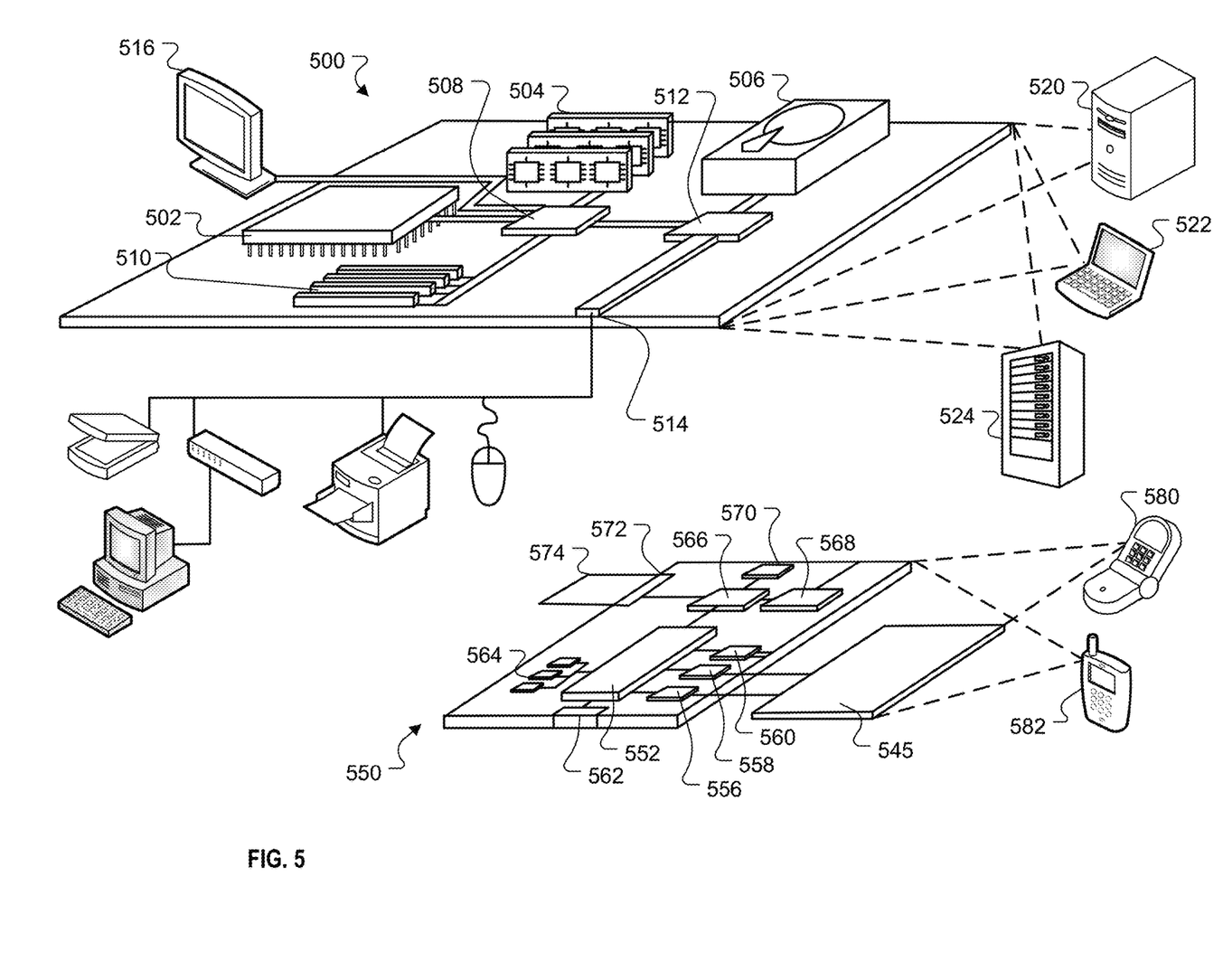
FIG. 5 shows a block diagram of a computing system that can be used in connection with computer-implemented methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
    accessing data representing items of an identifying information about an individual;
    assigning an item of the identifying information to an array of pixels that correspond to a section of an identification document, each pixel in the array of pixels having a corresponding optical density that represents a measure of relative brightness of the pixel;
    determining an encoding of the item based on a line pattern that includes a plurality of distinct line segments and the corresponding optical density of each pixel in the array of pixels;
    encoding the item of the identifying information at the section of the identification document by adjusting a respective optical density of each pixel in the array of pixels to apply the line pattern to the identification document; and
    based on the encoding, generating an identification document that i) includes the identifying information printed on the identification document and ii) encodes the item at the section using the plurality of distinct line segments of the line pattern.

2. The method of claim 1, wherein encoding the item comprises:
    selecting one or more pixels of the array of pixels; and
    assigning a particular optical density level to each of the selected one or more pixels of the array of pixels.

3. The method of claim 2, further comprising:
    generating the line pattern by ascribing a numerical or text value to the one or more pixels of the array of pixels using the particular optical density level assigned to each of the selected one or more pixels.

4. The method of claim 3, further comprising:
    generating multiple arrays of pixels, each array of pixels of the multiple arrays being generated based on a coded scheme to represent particular types of line patterns on the identification document; and
    generating a plurality of line patterns at the identification document at least by adjusting optical density of each pixel in the multiple arrays of pixels.

5. The method of claim 4, wherein each of the multiple arrays of pixels is disposed at a specific location of the identification document and is used to encode a different item of the identifying information about the individual.

6. The method of claim 1, wherein:
each pixel in the array of pixels is used to depict representations of an image of the individual and that corresponds to the item of the identifying information; and
the line pattern is detectable by a detector device based on differences in optical density of two or more pixels in the array of pixels.

7. The method of claim 1, further comprising:
detecting, by a detector device, the plurality of distinct line segments of the line pattern applied to the identification document based on the adjusted optical density of each pixel in the array of pixels.

8. The method of claim 7, further comprising:
obtaining, by the detector device, the item of the identifying information encoded at the section of the identification document in response to decoding each line segment of the plurality of distinct line segments.

9. The method of claim 1, wherein generating the identification document comprises:
using pixelation density increments to embed each of the items of the identifying information at the identification document.

10. The method of claim 9, wherein the identification document is a digital identification document and the encoded item of the identifying information describes a physical attribute of the individual.

11. A system, comprising:
one or more processing devices; and
one or more non-transitory machine-readable storage devices storing instructions that are executable by the one or more processing devices to cause performance of operations comprising:
accessing data representing items of an identifying information about an individual;
assigning an item of the identifying information to an array of pixels that correspond to a section of an identification document, each pixel in the array of pixels having a corresponding optical density that represents a measure of relative brightness of the pixel;
determining an encoding of the item based on a line pattern that includes a plurality of distinct line segments and the corresponding optical density of each pixel in the array of pixels;
encoding the item of the identifying information at the section of the identification document by adjusting a respective optical density of each pixel in the array of pixels to apply the line pattern to the identification document; and
based on the encoding, generating an identification document that i) includes the identifying information printed on the identification document and ii) encodes the item at the section using the plurality of distinct line segments of the line pattern.

12. The system of claim 11, wherein encoding the item comprises:
selecting one or more pixels of the array of pixels; and
assigning a particular optical density level to each of the selected one or more pixels of the array of pixels.

13. The system of claim 12, further comprising:
generating the line pattern by ascribing a numerical or text value to the one or more pixels of the array of pixels using the particular optical density level assigned to each of the selected one or more pixels.

14. The system of claim 13, wherein the operations further comprise:
generating multiple arrays of pixels, each array of pixels of the multiple arrays being generated based on a coded scheme to represent particular types of line patterns on the identification document; and
generating a plurality of line patterns at the identification document at least by adjusting optical density of each pixel in the multiple arrays of pixels.

15. The system of claim 14, wherein each of the multiple arrays of pixels is disposed at a specific location of the identification document and is used to encode a different item of the identifying information about the individual.

16. The system of claim 11, wherein:
each pixel in the array of pixels is used to depict representations of an image of the individual and that corresponds to the item of the identifying information; and
the line pattern is detectable by a detector device based on differences in optical density of two or more pixels in the array of pixels.

17. The system of claim 16, wherein the operations further comprise:
detecting, by a detector device, the plurality of distinct line segments of the line pattern applied to the identification document based on the adjusted optical density of each pixel in the array of pixels.

18. The system of claim 17, wherein the operations further comprise:
obtaining, by the detector device, the item of the identifying information encoded at the section of the identification document in response to decoding each line segment of the plurality of distinct line segments.

19. The system of claim 18, wherein generating the identification document comprises:
using pixelation density increments to embed each of the items of the identifying information at the identification document, wherein the identification document is a digital identification document and the encoded item of the identifying information describes a physical attribute of the individual.

20. One or more non-transitory machine-readable storage devices storing instructions that are executable by one or more processing devices to cause performance of operations comprising:
accessing data representing items of an identifying information about an individual;
assigning an item of the identifying information to an array of pixels that correspond to a section of an identification document, each pixel in the array of pixels having a corresponding optical density that represents a measure of relative brightness of the pixel;
determining an encoding of the item based on a line pattern that includes a plurality of distinct line segments and the corresponding optical density of each pixel in the array of pixels;
encoding the item of the identifying information at the section of the identification document by adjusting a respective optical density of each pixel in the array of pixels to apply the line pattern to the identification document; and
based on the encoding, generating an identification document that i) includes the identifying information printed on the identification document and ii) encodes the item at the section using the plurality of distinct line segments of the line pattern.

* * * * *